United States Patent [19]

Sturwold et al.

[11] 3,873,585

[45] Mar. 25, 1975

[54] PROCESS FOR THE RECOVERY OF POLYMERIC ACIDS FROM CLAYS

[75] Inventors: Robert J. Sturwold; Hubert J. Sharkey, both of Cincinnati, Ohio

[73] Assignee: Emery Industries, Inc., Cincinnati, Ohio

[22] Filed: July 18, 1973

[21] Appl. No.: 380,261

[52] U.S. Cl.................. 260/407, 260/97.7, 252/420
[51] Int. Cl............................ C09f 7/06, C11c 3/00
[58] Field of Search...................... 260/407; 252/420

[56] References Cited
UNITED STATES PATENTS

| | | | |
|---|---|---|---|
| 1,284,750 | 11/1918 | Munro | 252/420 X |
| 2,200,145 | 5/1940 | Barton | 252/420 X |
| 2,579,946 | 12/1951 | McClain | 210/42.5 |
| 2,793,219 | 5/1957 | Barrett et al. | 260/407 |
| 2,793,220 | 5/1957 | Barrett et al. | 260/407 |
| 3,412,039 | 11/1968 | Miller | 252/428 |

*Primary Examiner*—Donald G. Daus
*Assistant Examiner*—Diana G. Rivers
*Attorney, Agent, or Firm*—J. D. Rice; G. A. Baracka

[57] ABSTRACT

An aqueous process for the recovery of polymeric fatty acids from crystalline clay minerals including catalyst and bleaching clays is provided. The process involves contacting the clay containing the polymeric acid with a sufficient quantity of water and agitating to displace the polymeric acid, and when the displacement is essentially complete, recovering the polymeric fatty acid from the water and clay. An additional feature of this invention is the reuse of the clay for catalyst or bleaching purposes.

6 Claims, No Drawings

3,873,585

PROCESS FOR THE RECOVERY OF POLYMERIC ACIDS FROM CLAYS

BACKGROUND OF THE INVENTION

Numerous methods are described in the literature for the preparation of polymeric fatty acids including dimer, trimer and tetramer acids from unsaturated fatty acids. The unsaturated fatty acids employed may be mono- or polyunsaturated. One method commonly used to achieve polymerization is to heat the unsaturated fatty acid in the presence of a crystalline clay mineral which promotes the reaction. Common commercial crystalline clay minerals used for this purpose include montmorillonite, such as bentonite, kaolinite, hectorite, halloysite, attapulgite, sepiolite and the like. A small amount of water may be included in the process.

While this is a commonly practiced commercial procedure and these catalysts are extremely effective for promoting the formation of the dimer and higher polymeric fat acids, substantial quantities of the polymerized fat acid products are retained by the clay and lost when the clay is disposed of. This results in considerable economic loss in addition to creating a sanitary problem with regard to the disposal of the clay. Attempts to recover the polymeric fat acids from the clay catalyst and filter cake by extraction with hydrocarbon solvents such as hexane, heptane and other low boiling solvents have not been satisfactory since in addition to the poor economics involved the polymeric fat acids recovered in this way are discolored and unsuitable for most applications without further purification, which further increases the cost and is timeconsuming.

It would be highly useful and advantageous if a process were available to recover polymeric fatty acids from crystalline clay minerals used as catalysts, bleaching agents and filtering aids in processes for the preparation of polymeric fat acids. If by such a process it was possible to recover 90% or more of the polymeric fat acids from the clays, the overall efficiency of the polymerization would be significantly increased and considerable economic advantage would result. It would be even more desirable if the process was conducted without the use of costly hydrocarbon solvents and if the recovered polymeric acids had good color.

SUMMARY OF THE INVENTION

The present invention is directed to an aqueous process for the displacement and recovery of polymeric fatty acid from crystalline clay minerals employed as catalyst, bleaching agents and filtering aids in the polymerization of unsaturated fatty acids. The process comprises contacting the clay which contains the polymeric fatty acid with a quantity of water sufficient to displace the polymeric acid. The ratio of water to crystalline clay mineral will range from about 0.25:1 up to about 20:1 but is preferably between about 0.5:1 and 4:1. The mixture is heated at a temperature from about 40° to 100°C with agitation until the displacement of the polymeric fatty acid is essentially complete. Excellent results are obtained with vigorous agitation at temperatures from about 50° to 90°C. The displaced polymeric fatty acid is then recovered using conventional procedures. The catalyst clays treated in accordance with this invention may be reused as catalysts in subsequent polymerizations with acceptable results.

DETAILED DESCRIPTION

The present invention deals with the recovery of polymeric fatty acids from crystalline clay minerals. In its broadest terms the process is used to recover polymeric fatty acids from clays without regard to the type of crystalline clay mineral used or the manner in which it was used. This process has application with clays which are used as catalysts for the polymerization of unsaturated fatty acids, as bleaching or decolorizing agents used in conjunction therewith or as filter aids.

Numerous procedures such as those described in U.S. Pat. Nos. 2,793,219 and 2,793,220 are known for the preparation of polymeric acids from unsaturated fatty acids. In its simplest terms, the reaction involves heating a mixture of the unsaturated fatty acid, crystalline clay mineral and water in a reaction vessel equipped with an agitating means to maintain the clay in suspension. While it is desirable that this reaction be conducted at elevated pressure in order to facilitate the polymerization, it is not necessary. At the conclusion of the reaction, the charge is cooled, the mixture filtered to separate the clay, and the filtrate stripped under reduced pressure to remove non-polymerized fatty acids. The polymeric fatty acids are recovered as the residue. Crystalline clay minerals may also be employed in the work up of the product to facilitate filtering or, if the polymeric fatty acids are discolored, for bleaching or decolorizing purposes. The clays used for such polymerization processes may vary depending on their function, i.e. a conventional non-activated clay may be used as the catalyst while an acid-activated clay is used to bleach or decolorize the fatty acid product, however, all of the crystalline clay minerals which come in contact with the polymeric fatty acid material retain a large amount of the acid due to their large surface area. It is possible for a typical clay earth to retain an amount of the polymeric fatty acid equal to the original weight of the clay. If the clay is not treated to recover the retained polymeric fatty acid a significant loss of product will result and the overall efficiency of the polymerization process will be decreased.

The present process is useful with any polymeric acid-containing crystalline clay mineral. The polymeric fat acids may contain from about 32 to about 80 carbon atoms and are derived from mono-, di- or polyunsaturated fatty acids containing about 16 to 20 carbon atoms. The resulting polymeric acids may contain dimer, trimer, tetramer and higher polymeric products and are typically mixtures thereof. Especially useful for polymerization are the $C_{18}$ fatty acids such as oleic, linoleic and linolenic acids in which case the primary product is $C_{36}$ dimer acid with lesser amounts of trimer and tetramer acids. These unsaturated acids can be prepared synthetically or obtained using conventional procedures from highly unsaturated drying or non-drying oils such as linseed oil, safflower oil, soybean oil, tall oil, cottonseed oil, corn oil, and sunflower seed oil or tallow. The resulting fatty acid mixtures obtained in this manner may also contain some saturated acids, however, these acids do not enter into the reaction or otherwise interfere with the polymerization process. Commercial oleic acid, for example, usually contains about 5 to 10% saturated fatty acids, such as stearic and palmitic acids, however, these are not detrimental to the process.

Any of the common crystalline clay minerals such as montmorillonite, kaolinite, hectorite, halloysite, attapulgite, sepiolite and the like may be treated in accordance with the present process and the polymeric fatty acids readily released therefrom. Bentonites having a high content of montmorillonites, kaolinite, or attapulgite may also be used. The clays used may have an acid, neutral or basic reaction. They may be treated with an acid or basic substance to additionally activate the clay. One particularly useful clay is Filtrol, an acidic adsorbent and catalyst manufactured by Filtrol Corp., obtained from the mineral montmorillonite $(MgCa)OAl_2$ $5SiO_2nH_2O$. Naturally occurring clays such as Fuller's earth and Pikes Peak clay are also readily treated by the present process. In general, the montmorillonite group of clays is especially useful with this process.

The particle size of the clay is not critical and may be widely varied. With clays functioning as catalysts it is generally desirable that as great a surface area as possible be present since the catalyst efficiency, at least to some extent, is a function of the exposed surface. These clays may be such that 90% or more of the material can be passed through a 200 mesh screen, or more coarse clays can be used. The tendency to retain polymerized fatty acids is greater with small particle size clays having large surface area and consequently the process of the present invention finds particular applicability with these clay materials.

While the present process finds particular applicability with the above-mentioned crystalline clay minerals, it may also be used with other soft earthy materials commonly used as filter aids and decolorizing agents, such as diatomite (Kieselguhr) or perlite. These materials are often used to facilitate the filtering of the polymerized fatty acid, that is, to prevent packing of the filter cake, or as decolorizing or bleaching agents. They may be treated in the same manner as the crystalline clay minerals to displace the retained polymeric acids, either by themselves or combined with the clays.

To recover entrained polymeric fatty acid, the crystalline clay mineral is combined with a quantity of water and agitated, preferably while heating, until the polymeric fatty acid has been displaced. The ratio of water to clay, amount of agitation and the temperature and length of time of contact with the water all are important factors in the process. The efficiency of the displacement and the rate at which the displacement occurs are governed by the combined effect of these factors even though each may be varied over a wide range. The interdependence of these variables makes it possible to successfully carry out the process and obtain efficient displacement and good separation of the polymeric acid from the earths using a wide variety of process conditions.

The ratio of water to crystalline clay mineral may range from about 0.25:1 up to about 20:1 or higher. If too little water is used the mass becomes difficult to stir and also there is insufficient water to displace the fatty materials. On the other hand, too large an excess of water becomes uneconomical due to the increased size of equipment required and also increased power requirements for agitation and heating. For best results the ratio of water to clay is preferably maintained between about 0.5:1 and 4:1.

While the polymeric fatty acid can be displaced at ambient temperatures if very vigorous agitation is used, the process is generally conducted with heating at temperatures from about 40° to 100°C. Preferably the temperature of the mass is maintained from about 50°C to 90°C. At lower temperatures the time required for displacement is lengthened and agitation becomes more critical. While temperatures above 100°C may be utilized if desired this requires the use of closed vessels and otherwise complicates the process equipment.

To displace the polymeric fatty acid from the clay some form of agitation of the mass is required. The manner and type of agitation is not critical and may be by rocking, shaking or by the use of conventional paddle or blade stirrers. As indicated earlier the agitation time will vary depending on the temperature and the ratio of water to polymeric fatty acid, that is, the viscosity of the mass. In general, however, more vigorous agitation facilitates the displacement of the polymeric acid and reduces the time requirements.

The process is terminated when the displacement of the polymeric fatty acid from the clay is essentially complete. This is evidenced by a rapid separation of the clay, water and polymeric fatty acid phases when the agitation is stopped. If the clay does not settle and if the aqueous and oil phases do not begin to separate within a very short time after stopping the agitation or if distinct phases are not obtained the process should be continued until these do occur, indicating that the displacement is complete. Of course, the rate of separation of the phases will be dependent on the volume being treated. When small volumes are being treated the separation should be relatively rapid, however, when larger volumes are employed longer separation times will be required. In any event, the water and oil phases should be distinct and both should be relatively clear. The polymeric fat acid phase can be skimmed or decanted from the top of the water or the clay and aqueous phases discharged through the bottom of the vessel to leave the oil. Known recovery techniques can be used for this purpose. It is also possible to remove the clay from the mass by filtration prior to allowing the phases to separate. The polymeric fatty acids displaced from the clay are essentially identical in physical and chemical characteristics to the polymer acids obtained directly from the polymerization process. The color of the displaced acids is usually much closer to that of the originally obtained polymer acids than acids obtained by extraction with organic solvents. Fatty acids recovered with this process can be employed for the same purposes and treated in the same manner as polymeric fatty acids obtained directly from the polymerization. It may be advantageous to combine these acids with other polybasic acids.

In addition to improving the economics of the polymerization of unsaturated monocarboxylic acids to produce polymeric fatty acids by virtue of improving the recovery of polymeric fatty acids, the clay can be recovered and reused for additional savings. After the polymeric fatty acid is displaced from the crystalline clay mineral it is possible to reuse the clay as a polymerization catalyst. The efficiency of the clay may be slightly reduced, but surprisingly there is no significant impairment of the properties of the clay. The clay can be washed with an acid or alkaline material to regenerate it and further improve the efficiency but this is not necessary. Surprisingly, it has also been found that the crystalline clay minerals used for certain polymerization processes can be treated in accordance with the present process and reused several times and still be highly effective catalysts. Such regenerated crystalline clay minerals while they may not be desirable catalysts for polymerizations where high purity products are desired, can in many instances be employed in less critical processes, that is, where high efficiency and extremely pure materials are not critical. For example, these catalysts are extremely useful where crude monoolefinic unsaturated acids are being polymerized or in similar processes.

While it is not necessary to include other ingredients in the process to achieve good results, it may be desirable in certain instances to add agents which prevent foaming, facilitate separation and the like. In general, the addition of such agents does not adversely affect the efficiency of the process of this invention. These agents may typically constitute up to about 5% by weight of the water phase but, more preferably, they comprise less than about 3% of the water phase. Known antifoaming agents such as silicones, phosphoric acid, inorganic salts such as sodium chloride, can be utilized in the present process. Preferably, the additives will not form soaps with the polymeric fatty acid since the presence of soaps in the mixture retards the separation of the phases when the agitation is terminated.

The following examples illustrate the invention more fully, however, they are not intended as a limitation on the scope thereof. In the examples all weights and percentages are given on a weight basis unless otherwise indicated.

EXAMPLE I

One hundred parts of an alkaline montmorillonite clay which had been used in the polymerization of oleic acid for the production of $C_{36}$ dimer acid was combined with 100 parts water in a vessel fitted with a paddle stirrer and heated to approximately 90°C with rapid agitation. The oil present in the clay consisted of polymerized acids and also some of the original monocarboxylic acids which had not polymerized. The agitation and heating was continued until rapid separation of the phases was evident when the stirring was stopped. After allowing the phases to separate the oil and water layers were decanted from the crystalline clay mineral and filtered to remove the "fines." The clay was washed several times with water to remove the final traces of oil and the water wash combined with the oil/water phases which were then allowed to separate. Discharge of the aqueous phase through the bottom of the separatory vessel left 31.0 gms of a fatty acid mixture having a 9 to 10 Gardner color.

EXAMPLE II

The above process was repeated using equal parts of the montmorillonite catalyst and water. A less efficient type of agitation was employed by reducing the speed of agitation and the size of the stirring blade. Eighty-three precent fatty acids were nevertheless recovered from the clay catalyst. The acids had good color and were acceptable for use in most applications. By increasing the agitation time the amount of polymeric fat acid could be increased.

EXAMPLE III

Similar to Example I, equal parts by weight of the montmorillonite clay and water were heated to boiling with highly efficient agitation and the process repeated. 100% Recovery of the mixed acid product was obtained in a significantly shorter time than required for Example I. The polymeric fat acid recovered was comparable in quality and color to that of the previous Examples.

EXAMPLE IV

One hundred parts montmorillonite clay and 200 parts water were combined and the mass heated at about 90°C, with inefficient stirring comparable to that employed in Example II. About 80% fatty acid recovery was obtained. The recovery could be increased by increasing any or all of the following: the temperature; the amount of water used and the rate and length of agitation.

EXAMPLE V

The procedure of Example I was repeated at a 2:1 clay/water ratio using a temperature of about 90°C. When very efficient agitation of the viscous mass was employed about 85% recovery of the acids was obtained. With poor agitation the percent recovery decreased to about 32%. The increased viscosity of the aqueous clay slurry in this situation requires a highly efficient means of agitation if essentially complete displacement is to be achieved.

EXAMPLE VI

A $C_{36}$ dimer acid obtained from the dimerization of oleic acid was bleached with about 3% by wt. Filtrol (Grade 1). The mixture was heated to 90°–100°C with agitation for about 25 minutes, cooled and filtered. The bleaching clay was then subjected to an aqueous displacement process as described in Example I. About 90% recovery of the $C_{36}$ dimer acid was achieved with the dimer having approximately the same color as the filtrate.

EXAMPLE VII

To demonstrate the ability to reuse the clay catalyst treated in accordance with the instant invention to displace the polymeric fat acid, the following polymerization was conducted. Twelve hundred gms tall oil fatty acids, 96 gms montmorillonite clay catalyst and 12 gms co-catalyst were heated at 240°C with agitation for three hours under a nitrogen atmosphere. The reaction mixture was then cooled to about 100°C and 36 gms phosphoric acid added. The mixture was heated to about 100°C with stirring for about one hour and then allowed to stand until the catalyst settled. About 800 gms oil was obtained which upon distillation gave 67.2% yield of $C_{36}$ dimer acid having a Gardner color of 6.5 and a neutral equivalent of 292.

About 800 gms of water was added to the clay catalyst from the above polymerization and this mixture was heated at 95°C with stirring for about 2 hours. The mass was allowed to settle and the oil layer drawn off and dried at 140°C under nitrogen. Total recovery of $C_{36}$ dimer acid and unpolymerized fatty acid from the clay was about 95%. The dimer acid had a 9 Gardner color and neutral equivalent of 296. The clay and water were separated and 1,200 gms tall oil fatty acids and 12 gms of co-catalyst charged with the clay to a reactor and a polymerization conducted as described above (240°C for 3 hours under an $N_2$ atmosphere). A 64.7% yield of $C_{36}$ dimer acid was realized in this polymerization. The dimer acid had an 8.5 Gardner color and a neutral equivalent of 304. The above experiment clearly shows the ability to reuse the clay catalyst which has been treated in accordance with the present process and the exceptional and unexpected results obtained therewith.

We claim:

1. A process for recovering polymeric fatty acids from crystalline clay minerals which comprises heating a mixture of said clay earth and water at a temperature from about 40°C to 100°C, the ratio of water to clay ranging from about 0.25:1 up to about 20:1, agitating the mixture during said treatment to displace the polymeric fatty acid and then recovering said fatty material from the clay and water phases.

2. The process of claim 1 wherein the crystalline clay mineral is selected from the group consisting of montmorillonite, kaolinite, hectorite, halloysite, attapulgite, sepiolite and bentonites having a high montmorillonite, kaolinite or attapulgite content.

3. The process of claim 1 wherein the ratio of water to crystalline clay mineral is between about 0.5:1 and 4:1 and the temperature is maintained from about 50° to 90°C.

4. The process of claim 3 wherein the polymeric fatty acid is obtained from the polymerization of a $C_{18}$ unsaturated fatty acid and is primarily a $C_{36}$ dimer acid and the crystalline clay mineral is a montmorillonite.

5. The process of claim 2 wherein the process contains the additional steps of recovering the crystalline clay mineral and reusing the clay thus obtained as a catalyst for the polymerization of unsaturated monocarboxylic acids.

6. The process of claim 5 wherein the clay is a montmorillonite and the polymeric fatty acid is obtained from the polymerization of a $C_{18}$ unsaturated fatty acid and is primarily a $C_{36}$ dimer acid.

* * * * *